(12) United States Patent
Tan et al.

(10) Patent No.: US 9,281,749 B2
(45) Date of Patent: Mar. 8, 2016

(54) MULTIPLE POWER SUPPLY SYSTEMS AND METHODS

(75) Inventors: F. Dong Tan, Irvine, CA (US); Kwang M. Yi, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 822 days.

(21) Appl. No.: 13/584,537

(22) Filed: Aug. 13, 2012

(65) Prior Publication Data

US 2014/0042812 A1 Feb. 13, 2014

(51) Int. Cl.
*H02J 1/10* (2006.01)
*H02M 3/158* (2006.01)
*H02M 1/00* (2007.01)

(52) U.S. Cl.
CPC .......... *H02M 3/1584* (2013.01); *H02M 3/1588* (2013.01); *H02M 2001/008* (2013.01); *H02M 2003/1586* (2013.01); *Y02B 70/1466* (2013.01); *Y10T 307/50* (2015.04)

(58) Field of Classification Search
CPC ........... Y02B 70/1466; H02M 3/1584; H02M 2001/008; H02M 2003/1586; H02M 3/1588; Y10T 307/50
USPC ......................................................... 307/43
See application file for complete search history.

(56) References Cited

U.S. PATENT DOCUMENTS

| 5,721,483 A | 2/1998 | Kolluri et al. |
| 5,905,368 A | 5/1999 | Kolluri et al. |
| 5,973,939 A | 10/1999 | Tan |
| 7,170,269 B1 | 1/2007 | Doyle |
| 7,358,710 B2 | 4/2008 | Luo et al. |
| 7,368,959 B1 | 5/2008 | Xu et al. |
| 7,443,150 B2 | 10/2008 | Schiff |
| 7,564,702 B2 | 7/2009 | Schelcht |
| 2003/0214335 A1* | 11/2003 | Saeki ............................ 327/165 |
| 2003/0234635 A1 | 12/2003 | Currelly et al. |
| 2004/0113495 A1* | 6/2004 | Matsuo et al. .................. 307/29 |
| 2005/0184711 A1 | 8/2005 | Chen et al. |

(Continued)

FOREIGN PATENT DOCUMENTS

| CN | 201 789 416 U | 4/2011 |
| JP | H06 309044 A | 11/1994 |

(Continued)

OTHER PUBLICATIONS

Co-Pending US Application "Power Supply Systems and Methods".

(Continued)

*Primary Examiner* — Jared Fureman
*Assistant Examiner* — Duc M Pham
(74) *Attorney, Agent, or Firm* — Tarolli, Sundheim, Covell & Tummino LLP (57) ABSTRACT

Aspects of the present invention include a power supply system comprising a plurality of power supplies. Each of the power supplies can include an oscillator system configured to generate a clock signal at a clock node. Each of the power supplies can include an error amplifier configured to generate an error voltage at an error amplifier output node. Each of the power supplies can also include a pulse-width modulation (PWM) generator configured to generate a PWM switching signal based on an error voltage and the clock signal. Each of the power supplies can further include a power stage configured to generate an output voltage based on the PWM switching signal.

29 Claims, 4 Drawing Sheets

(56) References Cited

U.S. PATENT DOCUMENTS

| | | |
|---|---|---|
| 2007/0057638 A1* | 3/2007 | Lee et al. .................. 315/194 |
| 2007/0164715 A1 | 7/2007 | Zeng et al. |
| 2007/0241732 A1* | 10/2007 | Luo et al. .................. 323/281 |
| 2008/0100393 A1 | 5/2008 | Nuytkens et al. |
| 2008/0298093 A1 | 12/2008 | Jin et al. |
| 2010/0001699 A1 | 1/2010 | Dragojevic |
| 2010/0109713 A1 | 5/2010 | Harriman |
| 2010/0201405 A1 | 8/2010 | Ahmad et al. |
| 2010/0315052 A1 | 12/2010 | Zambetti et al. |
| 2011/0025284 A1 | 2/2011 | Xu et al. |
| 2011/0169471 A1* | 7/2011 | Nagasawa .................. 323/283 |

FOREIGN PATENT DOCUMENTS

| | | |
|---|---|---|
| JP | 2006 166613 A | 6/2006 |
| JP | 2006166613 A | 6/2006 |
| TW | 200810335 A | 2/2008 |
| TW | 200717982 A | 8/2010 |

OTHER PUBLICATIONS

International Search Report for corres. PCT/US2013/054159, completed Sep. 10, 2013 by Konstantin Kanelis of the EPO.
Search Report of Patent Application No. 102128816, Nov. 20, 2014, 1 page.

* cited by examiner

MULTIPLE POWER SUPPLY SYSTEMS AND METHODS

TECHNICAL FIELD

The present invention relates generally to electronic circuits, and specifically to multiple power supply systems and methods.

BACKGROUND

There is an ever increasing demand for power conversion and regulation circuitry to operate with increased efficiency. One such type of regulator circuit is known as a switching regulator or switching power supply. A switching power supply controls the flow of power to a load by controlling the "on" and "off" duty-ratio of one or more transistor switches coupled to the load. One such way of controlling the "on" and "off" time of the one or more transistor switches is to generate a pulse-width-modulated (PWM) signal, such that the "on" and "off" time of the one or more transistor switches is determined by relative pulse-widths of the PWM signal. Switching power supplies have been implemented as an efficient mechanism for providing a regulated output. Many different classes of switching power supplies exist today. In addition, multiple power supplies can be incorporated together, such as to provide point-of-load (POL) power to a variety of loads or to provided redundancy in generating an output voltage.

SUMMARY

One aspect of the present invention includes a power supply system. The power supply system includes a plurality of power supplies. Each of the plurality of power supplies can include an oscillator system configured to generate a clock signal at a clock node. The oscillator system of each of the plurality of power supplies can be electrically coupled at the clock node to synchronize the clock signal associated with each of the plurality of power supplies. Each of the power supplies can also include a pulse-width modulation (PWM) generator configured to generate a PWM switching signal based on an error voltage and the clock signal. Each of the power supplies can further include a power stage configured to generate an output voltage based on the PWM switching signal.

Another embodiment of the present invention includes a power supply system. The power supply system can include a plurality of power supplies. Each of the plurality of power supplies can include an error amplifier system. The error amplifier system can include an error amplifier configured to generate an error voltage at an error amplifier output node based on a feedback voltage of a respective one of the power supplies relative to a reference voltage. The error amplifier system can also include a diode interconnecting the error amplifier output node and a comparison node electrically coupled to each of the plurality of power supplies. The error amplifier system associated with one of the plurality of power supplies can provide the error voltage to the comparison node via the diode. Each of the power supplies can also include a PWM generator coupled to the comparison node and configured to generate a PWM switching signal based on the error voltage at the comparison node. Each of the power supplies can further include a power stage configured to generate an output voltage based on the PWM switching signal.

Another embodiment of the present invention includes a power supply system. The system includes a phase-shift controller configured to generate a plurality of clock signals. Each of the plurality of clock signals can be phase-shifted relative to each other. The system also includes a plurality of power supplies configured to generate at least one output voltage and being substantially spatially distributed. Each of the plurality of power supplies can include a power stage configured to control at least one switch based on a PWM switching signal to generate the respective at least one output voltage. Each of the power supplies can also include a PWM generator configured to generate the PWM switching signal in response to one of the plurality of clock signals.

Another embodiment of the present invention includes a method for controlling a power supply system. The power supply system can include a plurality of power supplies that are substantially spatially distributed. The method can include generating a plurality of PWM switching signals based on at least one clock signal. Each of the plurality of PWM switching signals can be phase-shifted relative to each other. The method also includes providing the plurality of PWM switching signals to at least one switch in a power stage associated with the respective plurality of power supplies. The method also includes alternately activating and deactivating the at least one switch in each of the power stages relative to a remaining at least one of the plurality of power supplies based on the phase-shift of the plurality of PWM switching signals. The method can further include generating at least one output voltage based on the activation and deactivation of the at least one switch in the power stage associated with each of the plurality of power supplies.

DETAILED DESCRIPTION

The present invention relates generally to electronic circuits, and specifically to power supply systems and method. A power supply system can include a plurality of power supplies, which can be arranged on an integrated circuit. Each of the power supplies can include an oscillator system configured to generate a clock signal at a clock node and an error amplifier configured to generate an error voltage at an error amplifier output node. Each of the power supplies can also include a pulse-width modulation (PWM) generator configured to generate a PWM switching signal based on an error voltage and the clock signal and a power stage configured to generate an output voltage based on the PWM switching signal.

As an example, the oscillator system of each of the power supplies can be configured to generate the clock signal at a clock node that is electrically coupled to the output of the oscillator system of each of the power supplies. Therefore, the clock signal of the oscillator system associated with each of the plurality of power supplies can be synchronized based on the electrical coupling. As another example, the error amplifier of each of the power supplies can be configured to generate the error voltage at an error amplifier output node based on a feedback voltage of a respective one of the power supplies relative to a reference voltage. A diode can interconnect the error amplifier output node and a comparison node that is electrically coupled to each of the plurality of power supplies. Therefore, the error amplifier associated with one of the plurality of power supplies can provide the error voltage to the comparison node via the diode, such that a given one of the error amplifiers can provide the error voltage to all of the power supplies at a given time.

As yet another example, the power supplies can be arranged substantially spatially about the IC. The power supply system can include a phase-shift controller configured to generate a plurality of clock signals, with each of the plurality of clock signals being phase-shifted relative to each other. The plurality of clock signals can be generated based on a main clock signal, such as generated from one or all of the oscillator systems of the respective power supplies. The PWM generator of each of the power supplies can thus generate the PWM switching signal in response to one of the plurality of clock signals, such that the PWM switching signals are each likewise phase-shifted relative to each other. The power stage of each of the power supplies can thus control at least one switch based on a PWM switching signal to generate at least one output voltage.

Figure 1:
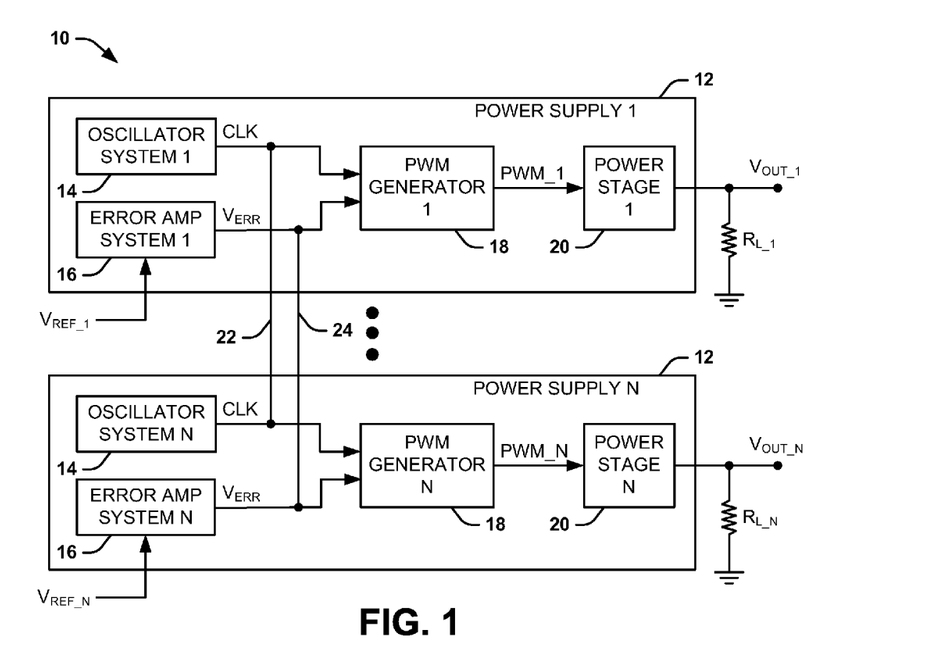
FIG. 1 illustrates an example of a power supply system in accordance with an aspect of the invention.

FIG. 1 illustrates an example of a power supply system 10 in accordance with an aspect of the invention. The power supply system 10 can be implemented in any of a variety of applications, such as for portable consumer devices, industrial applications, or for use in extreme temperature applications, such as part of a satellite payload or control system. For example, the power supply system 10 can be implemented as backward compatible retrofits for existing analog-controlled power supply system designs, such as being implemented in one or more integrated circuits (ICs) that can replace on-board analog point-of-load (POL) power supply controller(s). The power supply system 10 includes a plurality N of power supplies 12, where N is a positive integer greater than one. In the example of FIG. 1, each of the power supplies 12 is configured to generate a respective output voltage $V_{OUT}$, demonstrated in the example of FIG. 1 as $V_{OUT\_1}$ through $V_{OUT\_N}$. Each of the separate respective output voltages $V_{OUT\_1}$ through $V_{OUT\_N}$ can have approximately the same magnitude, or can be different. In addition, it is to be understood that the power supply system 10 is not limited to providing a separate output voltage $V_{OUT}$ from each respective power supply 12, but could instead redundantly provide a single output voltage $V_{OUT}$ from all of the power supplies 12.

Each of the power supplies 12 includes an oscillator system 14, an error amplifier system 16, a pulse-width modulation (PWM) generator 18, and a power stage 20. The oscillator system 14 is configured to generate a clock signal CLK, which can be a ramp signal or a digital pulse having a predefined frequency. The error amplifier system 16 is configured to generate an error voltage $V_{ERR}$ based on a respective reference voltage $V_{REF}$, demonstrated in the example of FIG. 1 as $V_{REF\_1}$ through $V_{REF\_N}$, respectively. As an example, the reference voltages $V_{REF\_1}$ through $V_{REF\_N}$ can have amplitudes that are individually tuned to set respective magnitudes of the output voltages $V_{OUT\_1}$ through $V_{OUT\_N}$. As another example, the reference voltages $V_{REF\_1}$ through $V_{REF\_N}$ can have the same magnitude (e.g., can be provided from a common node) to define a substantially equal magnitude for the output voltages $V_{OUT\_1}$ through $V_{OUT\_N}$ or for a common voltage $V_{OUT}$. As yet another example, the reference voltage $V_{REF}$ can be defined based on a digital control system, such as described in pending application, Ser. No. 13/584514, incorporated herein by reference in its entirety. The error amplifier system 16 can be configured to generate the error voltage $V_{ERR}$ based on a difference between the reference voltage $V_{REF}$ and a feedback voltage associated with the output voltage $V_{OUT}$. Therefore, the error voltage $V_{ERR}$ can be implemented to maintain a substantially constant magnitude of the output voltage $V_{OUT}$.

The clock signal CLK and the error voltage $V_{ERR}$ are each provided to the PWM generator 18. The PWM generator 18 can thus generate a switching signal PWM, demonstrated in the example of FIG. 1 as switching signals PWM_1 through PWM_N, respectively, based on the clock signal CLK and the error voltage $V_{ERR}$. For example, the PWM generator 18 can include a comparator configured to compare the error voltage $V_{ERR}$ with a ramp signal associated with the clock signal CLK, which could be the clock signal CLK itself, to generate the switching signal PWM having a duty-cycle that is proportional with the magnitude of the error voltage $V_{ERR}$. The switching signal PWM can thus be provided to the power stage 20 for control of one or more switches based on the switching signal PWM for generation of the output voltage $V_{OUT}$. The output voltage $V_{OUT}$ can thus provide power for a load $R_L$, demonstrated in the example of FIG. 1 as $R_{L\_1}$ through $R_{L\_N}$, respectively.

In the example of FIG. 1, the clock signal CLK is provided from the output of the oscillator system 14 of each of the power supplies 12 onto a common clock node 22, such that the outputs of the oscillator systems 14 are electrically coupled together. As a result, the clock signal CLK of the oscillator system 14 of each of the power supplies 12 is substantially synchronized as the single clock signal CLK. As an example, the oscillator system 14 of each of the power supplies 12 can be configured substantially the same, such that the circuit components of a given one of the oscillator systems 14 in each of the respective power supplies 12 can have substantially the same characteristics (i.e., resistance values, capacitance values, etc.) as the oscillator systems 14 of the remaining one or more power supplies 12. As an example, the oscillator systems 14 can be fabricated from a common process, such that the oscillator systems 14 can be substantially process matched at fabrication. Each of the oscillator systems 14 can be configured in a variety of different manners to provide the clock signal CLK. For example, the oscillator system 14 of each of the power supplies 12 can be configured substantially similar to the oscillator system described in co-pending application, Ser. No. 13/584514. As a result, the power supply system 10 can achieve one-wire synchronization based on coupling the outputs of each of the oscillator systems 14 via a single conductor (i.e., the common clock node 22).

As a result of the coupling of the oscillator systems 14 via the clock node 22, the single clock signal CLK can have a frequency and signal characteristics that are based on the characteristics and the relative fabrication tolerances of the circuit components associated with the oscillator systems 14. For example, the characteristics of the circuit components of a given one of the oscillator systems 14 can dictate a high pulse-width and a low pulse-width of the clock signal CLK output from that respective one of the oscillator systems 14. However, the fabrication tolerances of the circuit components associated with a given one of the oscillator systems 14 relative to the one or more other oscillator systems 14 can dictate that the high pulse-width and the low pulse-width of the given one of the oscillator systems 14 can differ slightly from the other one or more oscillator systems 14. As a result, the coupling of the outputs of the oscillator systems 14 via the clock node 22 can result in the common clock signal CLK having a high pulse-width that is determined by the oscillator system 14 having a shortest high pulse-width and a low pulse-width that is determined by the oscillator system 14 having a longest high pulse-width as a result of the relative fabrication tolerances of the circuit components therein. Moreover, slight variations in the circuit components (e.g., variations in resistance and/or capacitance of one or more circuit components) of a given one of the oscillator systems 14 relative to the one or more other oscillator systems 14 can likewise result in synchronization of the outputs of the oscillator systems 14 as the common clock signal CLK at the clock node 22 in a manner similar to variations in fabrication tolerances.

Accordingly, the coupling of the outputs of the oscillator systems 14 via the clock node 22 results in a common clock signal CLK provided from redundant oscillator systems 14 that are synchronized based on electrical coupling of the respective outputs of the oscillator systems 14. In this manner, synchronization of the oscillator systems 14 can be achieved in a very efficient and inexpensive manner. Such an arrangement of the oscillator systems 14 to provide synchronization of the oscillator systems 14 is also achieved in this manner without a designated master/slave relationship between the oscillator systems 14, as the frequency and characteristics of the clock signal are set automatically based on the coupling of the outputs of the oscillator systems 14 via the clock node 22. Furthermore, based on the synchronization of the outputs of the oscillator systems 14, the common clock signal CLK is substantially insensitive to noise affecting a given one of the oscillator systems 14, as the frequency and signal characteristics of the common clock signal CLK are automatically set based on the characteristics and the relative fabrication tolerances of the circuit components associated with the oscillator systems 14. As such, the frequency and signal characteristics of the common clock signal CLK can override noise affecting a given one of the oscillator systems 14.

Additionally or alternatively, in the example of FIG. 1, the error voltage $V_{ERR}$ is provided from the output of the error amplifier system 16 of each of the power supplies 12 onto a comparison node 24, such that the outputs of the error amplifier systems 16 are electrically coupled together. As a result, the error voltage $V_{ERR}$ can be applied from a given one of the error amplifier systems 14 having the greatest magnitude to each of the PWM generators 18 via the comparison node 24. As an example, the error amplifier systems 16 can be configured substantially the same, such that the circuit components of a given one of the error amplifier systems 16 in each of the respective power supplies 12 can have substantially the same characteristics (i.e., resistance values, capacitance values, etc.) as the error amplifier systems 16 of the remaining one or more power supplies 12. As an example, the error amplifier systems 16 can be fabricated from a common process, such that the error amplifier systems 16 can be substantially process matched at fabrication. Accordingly, the power supply system 10 can achieve one-wire load sharing based on coupling the outputs of each of the error amplifier systems 16 via a single conductor (i.e., the comparison node 24), as described in greater detail herein.

Figure 2:
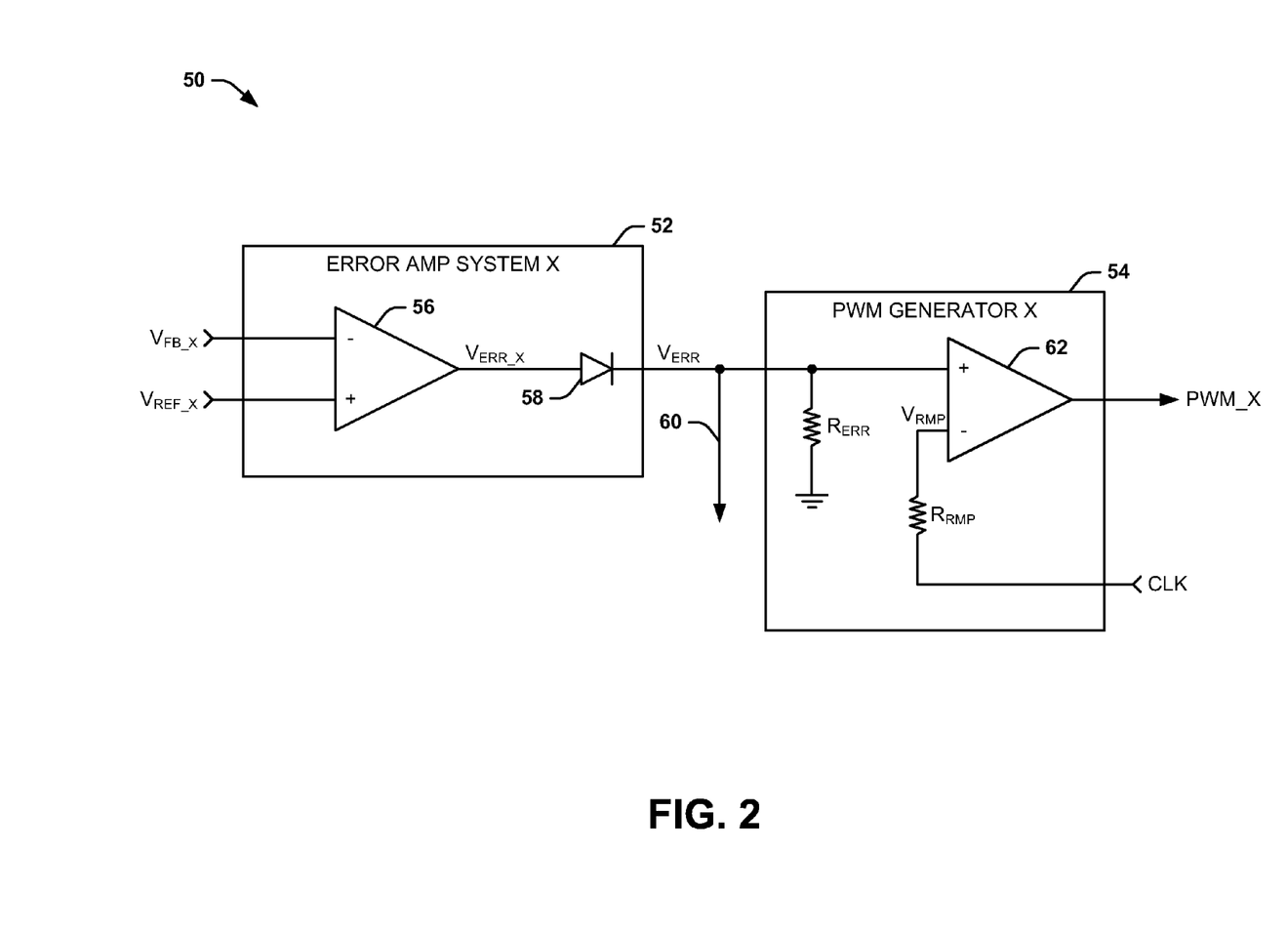
FIG. 2 illustrates an example of a power supply circuit in accordance with an aspect of the invention.

FIG. 2 illustrates an example of a power supply circuit 50 in accordance with an aspect of the invention. The power supply circuit 50 includes an error amplifier system 52 and a PWM generator 54. The power supply circuit 50 can be associated with a given one of the power supplies 12, such that the error amplifier system 52 can correspond to the error amplifier system 14 and the PWM generator 54 can correspond to the PWM generator 18 in the example of FIG. 1. Thus, the error amplifier system 52 and the PWM generator 54 are designated as ERROR AMP SYSTEM X and PWM GENERATOR X, where X corresponds to one of the N power supplies 12. Therefore, reference is to be made to the example of FIG. 1 in the following description of the example of FIG. 2.

The error amplifier system 52 includes an error amplifier 56 and a diode 58. The error amplifier 56 is configured to compare the reference voltage $V_{REF\_X}$ with a feedback voltage $V_{FB\_X}$ and to provide an error voltage $V_{ERR\_X}$ having a magnitude that is based on a difference between the reference voltage $V_{REF\_X}$ and the feedback voltage $V_{FB\_X}$. As an example, the feedback voltage $V_{FB\_X}$ can have a magnitude that is proportional to the respective output voltage $V_{OUT\_X}$ of the power supply 12 in which the error amplifier system 52 is included. The error voltage $V_{ERR\_X}$ thus has a magnitude that is based on the difference between the reference voltage $V_{REF\_X}$ and the feedback voltage $V_{FB\_X}$ for maintaining the magnitude of the output voltage $V_{OUT\_X}$ at a predetermined magnitude, as described in greater detail herein. In addition, it is to be understood that the error amplifier system 52 can include additional circuit components, such as one or more compensation circuit components interconnecting the error voltage $V_{ERR\_X}$ and the feedback voltage $V_{FB\_X}$, such as to act as a low-pass filter for the error voltage $V_{ERR\_X}$.

The error voltage $V_{ERR\_X}$ can be provided to a comparison node 60 across the diode 58 as the error voltage $V_{ERR}$ across a resistor $R_{ERR}$ in the PWM generator 54 based on a forward-bias of the diode 58. The comparison node 60 can correspond to the comparison node 24 in the example of FIG. 1, such that the comparison node 60 can be electrically coupled to additional error amplifier systems 16 and corresponding additional PWM generators 18 in the other respective power supplies 12. Therefore, the error voltage $V_{ERR}$ corresponds to the error voltage $V_{ERR}$ that is provided to each of the PWM generators 18 in each of the respective power supplies 12. As described previously, the error voltage $V_{ERR\_X}$ has a magnitude that is based on a difference between the feedback voltage $V_{FB\_X}$ and the reference voltage $V_{REF\_X}$. However, as an example, the error voltage $V_{ERR\_X}$ can have a different magnitude than an error voltage $V_{ERR\_Y}$ that is output from an error amplifier system 16 of a respective other power supply 12 based on a difference between a respective feedback voltage $V_{FB\_Y}$ and a respective reference voltage $V_{REF\_Y}$.

As another example, the error amplifier systems 16 can each be configured substantially the same (e.g., substantially similar to the error amplifier system 52), such that the circuit components of a given one of the error amplifier systems 16 in each of the respective power supplies 12 can have substantially the same characteristics (i.e., resistance values, capacitance values, etc.) as the error amplifier systems 16 of the remaining one or more power supplies 12. For example, the reference voltage $V_{REF\_X}$ and/or the feedback voltage $V_{FB\_X}$ can be a common reference voltage that is provided to all of the error amplifier systems 16, such that the power supplies 12 are configured as redundant power supplies to regulate a common output voltage $V_{OUT}$. However, the relative fabrication tolerances of the circuit components associated with the error amplifier systems 16 can result in slightly different magnitudes of the error voltages $V_{ERR\_X}$ generated by each of the error amplifier systems 16. Therefore, the error voltage $V_{ERR}$ at the comparison node 60 (e.g., the comparison node 24 in the example of FIG. 1) can have a magnitude that is based on the error voltage $V_{ERR\_X}$ output from the respective error amplifier systems 52 having the greatest magnitude. For instance, because the greatest magnitude of the error voltage $V_{ERR\_X}$ will forward-bias the diode 58, that error voltage $V_{ERR\_X}$ will be provided at the comparison node 60 as the common error voltage $V_{ERR}$, while the diode 58 of the error amplifier systems 16 of the other one or more power supplies 12 will be reversed-biased based on the lesser magnitudes of the respective other error voltage $V_{ERR\_X}$. Accordingly, the error voltage $V_{ERR}$ on the comparison node 60 is automatically set to be substantially equal to the error voltage $V_{ERR\_X}$ generated by a respective one of the error amplifier systems 16 having the greatest magnitude.

As a result of the configuration of the power supply circuit 50 in which the error voltage $V_{ERR}$ on the comparison node 60 being automatically set by the respective one of the error amplifier systems 16 having the greatest magnitude, the error amplifier systems 16 of the respective power supplies 12 operate in a redundant manner, as opposed to a configuration that includes a single master error amplifier that provides the error voltage $V_{ERR}$. For example, if a given one of the error amplifier systems 16 that is providing the error voltage $V_{ERR}$ on the comparison node 60 fails, an error amplifier system 16 of a different power supply 12 having a next greatest magnitude of the error voltage $V_{ERR\_X}$ will automatically take over to provide the error voltage $V_{ERR}$ on the comparison node. Accordingly, the error voltage $V_{ERR}$ is provided in a very robust manner to substantially mitigate the effects of circuit failure in the error amplifier system 10. In addition, because the error voltage $V_{ERR}$ is automatically set by the error voltage $V_{ERR\_X}$ having the greatest magnitude, the error amplifier systems 16 need not include tight manufacturing tolerances, such that the error amplifier systems 16 can be fabricated using substantially cheaper components.

In the example of FIG. 2, the PWM generator 54 includes a comparator 62 configured to compare the error voltage $V_{ERR}$ and a ramp voltage $V_{RMP}$. The ramp voltage $V_{RMP}$ is demonstrated as being provided by the clock signal CLK via a resistor $R_{RMP}$. The clock signal CLK can be provided from one or more of the oscillator systems 14, such as via the clock node 22. For example, the clock signal CLK can be a ramp signal, such that the ramp voltage $V_{RMP}$ is a voltage associated with the clock signal CLK. As another example, the PWM generator 54 can include a ramp generator (not shown) configured to generate a ramp signal in response to the clock signal CLK, such that the ramp voltage $V_{RMP}$ can be generated by the ramp generator. The PWM generator 54 can thus generate a digital switching signal PWM_X having a duty-cycle that is based on the magnitude of the error voltage $V_{ERR}$.

Figure 3:
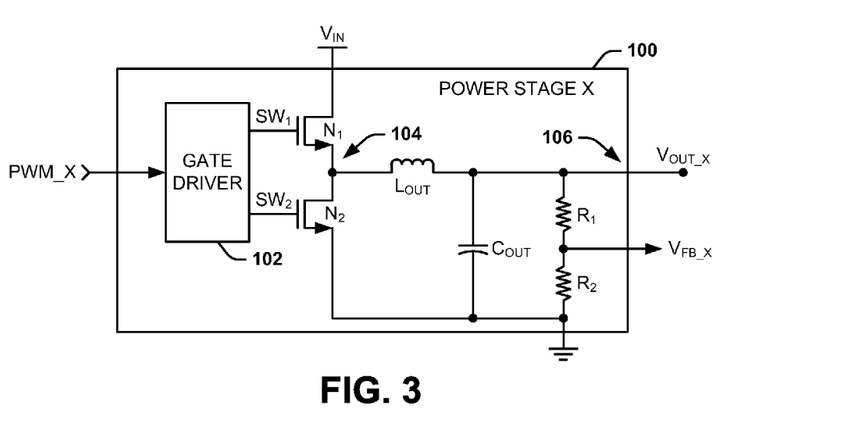
FIG. 3 illustrates an example of a power stage in accordance with an aspect of the invention.

FIG. 3 illustrates an example of a power stage 100 in accordance with an aspect of the invention. The power stage 100 can correspond to the power stage 20 in the example of FIG. 1. Therefore, reference is to be made to the example of FIGS. 1 and 2 in the following description of the example of FIG. 3.

The power stage 100 includes a gate driver 102. The gate driver 102 is configured to generate switching signals $SW_1$ and $SW_2$ in response to the switching signal PWM_X, such as provided from the PWM generator 54 in the example of FIG. 2. The switching signals $SW_1$ and $SW_2$ are provided to respective transistors $N_1$ and $N_2$. The transistor $N_1$ interconnects an input voltage $V_{IN}$ and a switching node 104 and the transistor $N_2$ interconnects the switching node 104 with a low voltage rail, demonstrated in the example of FIG. 3 as ground. The power stage 100 also includes an inductor $L_{OUT}$ that interconnects the switching node 104 and an output 106 on which the output voltage $V_{OUT\_X}$ is provided, and further includes an output capacitor $C_{OUT}$ interconnecting the output 106 and the low voltage rail. Therefore, the power stage 100 in the example of FIG. 3 is configured as a buck-converter that generates the output voltage $V_{OUT\_X}$ based on alternate switching of the transistors $N_1$ and $N_2$ to generate current through the inductor $L_{OUT}$.

As an example, the output voltage $V_{OUT\_X}$ can be an output voltage corresponding to a given one of the power supplies 12 in the example of FIG. 1. As another example, the output voltage $V_{OUT\_X}$ could correspond to a collective output voltage of the power supplies 12 of the power supply system 10 in the example of FIG. 1, such that the output node 106 is coupled to the output node associated with all of power supplies 12. In addition, the power stage 100 includes a pair of feedback resistors $R_1$ and $R_2$ interconnecting the output node 106 and the low voltage rail, and which are configured to generate the feedback voltage $V_{FB\_X}$. The feedback voltage $V_{FB\_X}$ thus has a magnitude that is proportional to the output voltage $V_{OUT\_X}$. The feedback voltage $V_{FB\_X}$ can thus be provided to the error amplifier system, such as the error amplifier system 16 or the error amplifier system 52 in the examples of FIGS. 1 and 2, respectively. Therefore, the feedback voltage $V_{FB\_X}$ can be implemented to generate the switching signal PWM_X for maintaining the magnitude of the output voltage $V_{OUT\_X}$.

It is to be understood that the power stage 100 is not intended to be limited to the example of FIG. 3. For example, while the power stage 100 is demonstrated as a buck-converter, other types of power supplies can be implemented in the power stage, such as boost or buck-boost converters. In addition, the power stage 100 is not limited to implementing two N-type field effect transistors (FETs) for the transistors, but could instead use a single switch, P-type switches, or a combination therein. Furthermore, the power stage 100 can include additional circuit components, such as to provide temperature compensation, for example, as described in co-pending application, Ser. No. 13/584514. Therefore, the power stage 100 can be configured in a variety of ways.

Figure 4:
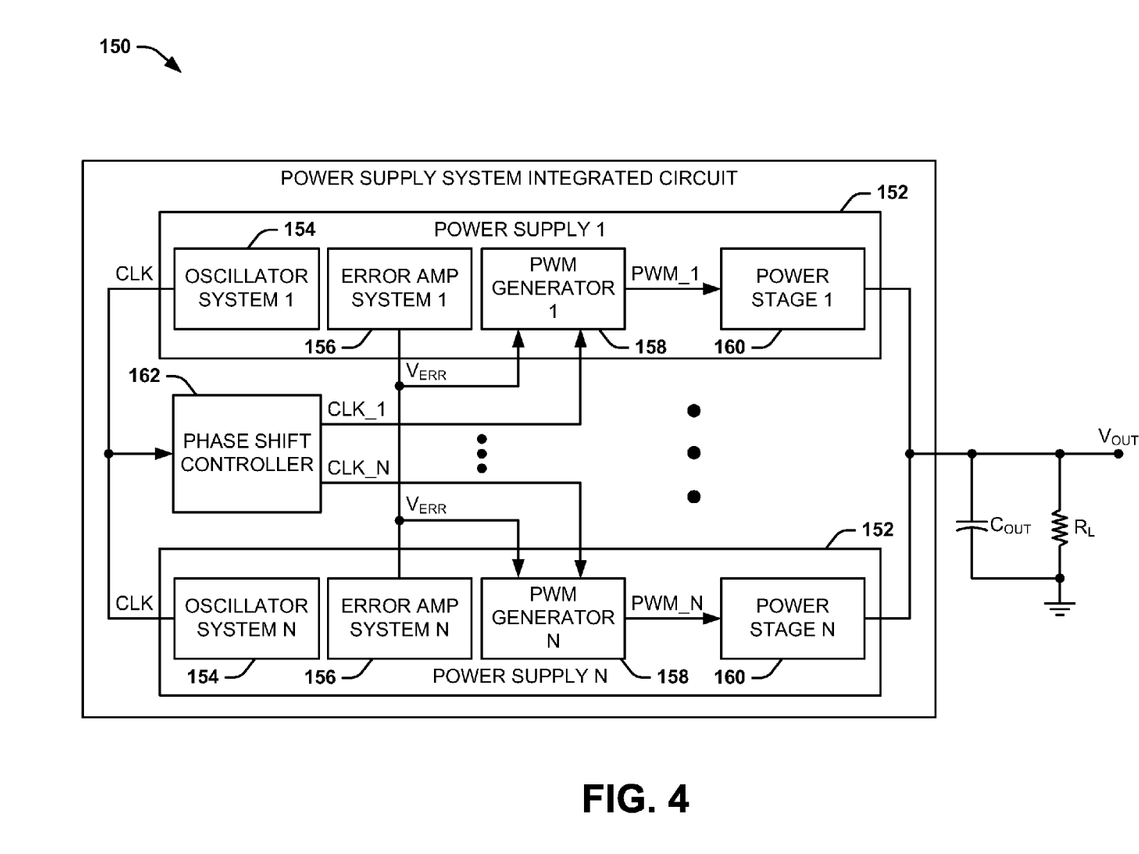
FIG. 4 illustrates another example of a power supply system in accordance with an aspect of the invention.

FIG. 4 illustrates an example of a power supply system 150 in accordance with an aspect of the invention. The power supply system 150 can be implemented in any of a variety of applications, such as for portable consumer devices, industrial applications, or for use in extreme temperature applications, such as part of a satellite payload or control system. The power supply system 150 includes a plurality N of power supplies 152, where N is a positive integer greater than one. In the example of FIG. 4, the power supplies 152 are configured to generate a collective output voltage $V_{OUT}$, such that an output of each of the power supplies 152 is electrically coupled together. Accordingly, the power supplies 152 are configured as redundant power supplies. In addition, as another example, each of the power supplies 152 can be substantially spatially arranged on the power supply system 150. For example, the power supplies 152 can be arranged in distinct locations about the IC, such as approximately symmetrically distributed about a printed circuit board (PCB) or within an IC.

Each of the power supplies 152 includes an oscillator system 154, an error amplifier system 156, a PWM generator 158, and a power stage 160. In the example of FIG. 4, the oscillator systems 154 are coupled together, such as via a clock node, to generate a clock signal CLK, which can be a ramp signal or a digital pulse having a predefined frequency. Therefore, the oscillator systems 154 can each be configured substantially similar to the oscillator systems 14 in the example of FIG. 1. As an example, the oscillator systems 154 can each be configured to be substantially the same, such that the frequency and signal characteristics of the clock signal CLK can be based on the characteristics and the relative fabrication tolerances of the circuit components associated with the oscillator systems 154.

The error amplifier systems 156 are configured to generate an error voltage $V_{ERR}$ based on a reference voltage $V_{REF}$ (not shown). As an example, the reference voltage $V_{REF}$ can have a predetermined magnitude to define a desired magnitude for the output voltage $V_{OUT}$. For example, the error amplifier systems 156 can be configured to generate the error voltage $V_{ERR}$ based on a difference between the reference voltage $V_{REF}$ and a feedback voltage associated with the output voltage $V_{OUT}$ to maintain a substantially constant magnitude of the output voltage $V_{OUT}$. In the example of FIG. 4, the error voltage $V_{ERR}$ is provided on a common comparison node that is coupled to each of the PWM generators 158. Therefore, the error amplifier systems 156 can be configured substantially similar to the error amplifier system 52 in the example of FIG. 2, such that the error voltage $V_{ERR}$ can be provided by a single one of the error amplifier systems 156 at a given time based on the relative fabrication tolerances of the circuit components associated with the error amplifier systems 156.

The power supply system 150 also includes a phase-shift controller 162. The phase-shift controller 162 is configured to generate a plurality N of clock signals CLK_1 through CLK_N corresponding to the respective plurality N of power supplies 152. As an example, the plurality of clock signals CLK_1 through CLK_N can be generated based on the clock signal CLK on the clock node coupled to each of the oscillator systems 154. The phase-shift controller 162 can thus be configured to generate the clock signals CLK_1 through CLK_N as phase-shifted versions of the clock signal CLK. For example, the phase-shift controller 162 can generate the clock signals CLK_1 through CLK_N to have an approximately equal phase shift with respect to each consecutive one of the clock signals CLK_1 through CLK_N. As an example, for N=4, each of the clock signals CLK_1 through CLK_4 can be approximately 90° phase-shifted from a next consecutive clock signal CLK_1 through CLK_4.

The clock signals CLK_1 through CLK_N and the error voltage $V_{ERR}$ are each provided to a respective one of the PWM generators 158. The PWM generators 158 can thus generate switching signals PWM_1 through PWM_N, based on the respective clock signals CLK_1 through CLK_N and the error voltage $V_{ERR}$. For example, the PWM generators 158 can each include a comparator configured to compare the error voltage $V_{ERR}$ with a ramp signal associated with the respective clock signals CLK_1 through CLK_N to generate switching signals PWM_1 through PWM_N having a duty-cycle that is proportional with the magnitude of the error voltage $V_{ERR}$. Because the switching signals PWM_1 through PWM_N are generated via the respective clock signals CLK_1 through CLK_N, each consecutive one of the switching signals PWM_1 through PWM_N can likewise be phase-shifted by an approximately equal amount. The switching signals PWM_1 through PWM_N can thus be provided to the respective power stages 160 for control of one or more switches to generate the output voltage $V_{OUT}$, which can provide power for a load $R_L$ across an output capacitor $C_{OUT}$. As an example, the power stages 160 can each be configured substantially similar to the power stage 100 in the example of FIG. 3.

Therefore, based on the phase-shift of the respective switching signals PWM_1 though PWM_N, the switching of the switches in the power stages 160 can be alternately staggered in controlling the respective power supplies 152 to generate the single output voltage $V_{OUT}$. As a result, because the power supplies 152 are spatially distributed (e.g., across a PCB or IC), the power supplies 152 can each implement smaller circuit components and the power supply system 150 can exhibit better thermal distribution than a single power supply generating the output voltage $V_{OUT}$. Accordingly, the power supplies 152 can be implemented as independently regulator power supplies in a compact common package (e.g., two-in-one packaging) for generating the output voltage $V_{OUT}$, such that the compact common package can be manufactured at a substantially reduced cost relative to individual power supply packages. Such a compact common package can likewise have better mass distribution for substantially reducing vibration levels and for ease of installation. In addition, an RMS current into the input and output capacitors associated with the inductor (i.e., the inductor $L_{OUT}$) in each of the power stages 160 can be substantially reduced in generating the output voltage $V_{OUT}$ relative to an individual power supply. For example, the RMS current can be approximately zero at a duty-cycle of the power stages 160 of approximately 50%. Additionally, based on an effective higher frequency of switching for the collective power supplies 152 in generating the output voltage $V_{OUT}$, the power supply system 150 can exhibit improved transient response than an individual power supply. Furthermore, because the power supplies 152 collectively generate the output voltage $V_{OUT}$, each of the power supplies 152 can consume significantly less power than a single power supply generating the output voltage $V_{OUT}$.

It is to be understood that the power supply system 150 is not intended to be limited to the example of FIG. 4. As an example, while the example of FIG. 4 demonstrates generating a single output voltage $V_{OUT}$, the power supply system 150 can instead generate individual output voltages $V_{OUT\_1}$ through $V_{OUT\_N}$, similar to as described above in the example of FIG. 1. In addition, the output voltage $V_{OUT}$ can be generated as a negative output voltage, such as based on implementation of a flyback or a Cuk power circuit topology of the power supplies 152. In addition, the power supply system 150 can implement a single oscillator that is configured to generate the clock signal CLK instead of implementing the oscillator systems 154 that are synchronized via a clock node. Furthermore, the power supply system 150 need not incorporate a single error voltage $V_{ERR}$ on the comparison node, but could instead generate individual error voltages that are provided to the respective PWM generators 158. Accordingly, the power supply system 150 can be configured in a variety of ways.

Figure 5:
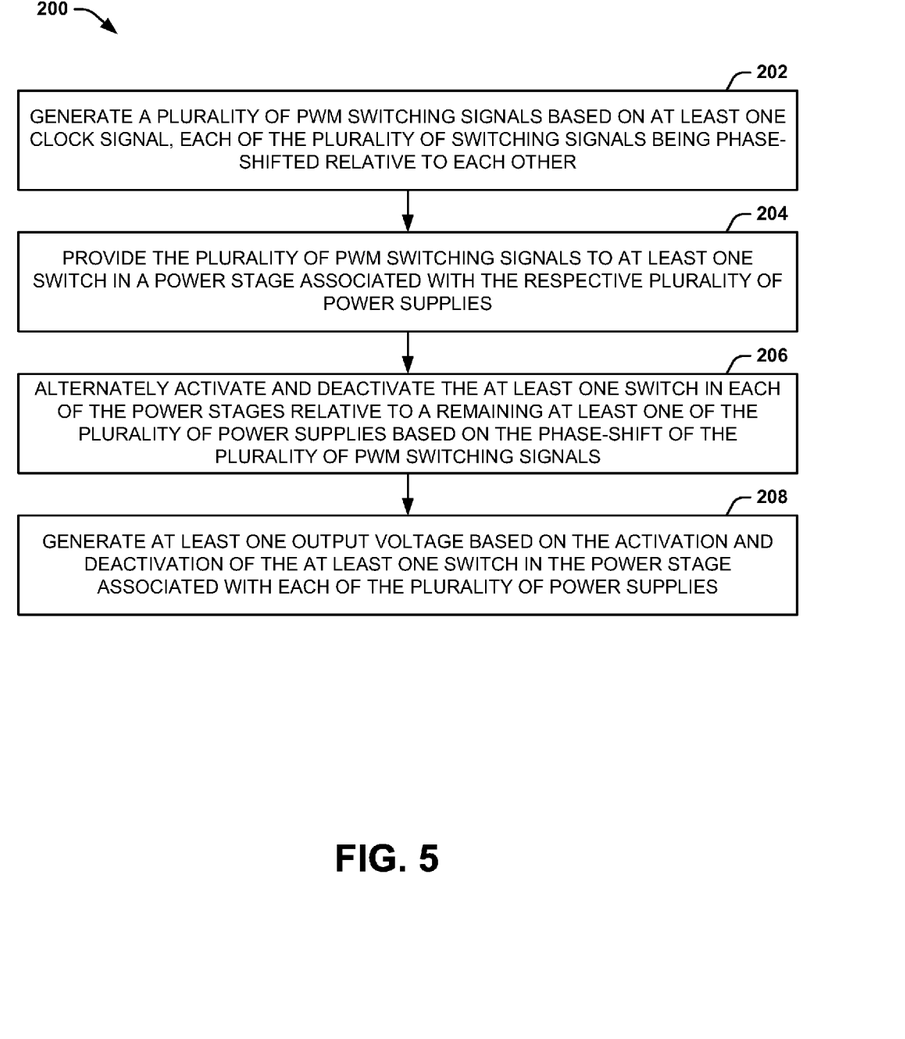
FIG. 5 illustrates a method for controlling a power supply system in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates an example of a method 200 for controlling a power supply system in accordance with an aspect of the invention. At 202, a plurality of PWM switching signals are generated based on at least one clock signal, each of the plurality of PWM switching signals being phase-shifted relative to each other. The PWM switching signals can be generated from clock signals that are likewise phase-shifted, with the phase-shift being approximately equal for each consecutive one of the clock signals. At 204, the plurality of PWM switching signals are provided to at least one switch in a power stage associated with the respective plurality of power supplies. At 206, the at least one switch in each of the power stages is alternately activated and deactivated relative to a remaining at least one of the plurality of power supplies based on the phase-shift of the plurality of PWM switching signals. The power supplies can be spatially distributed relative to each other, such as across a PCB or IC, and can thus be exhibit better thermal control based on the alternate activation and deactivation of the respective switches. At 208, at least one output voltage is generated based on the activation and deactivation of the at least one switch in the power stage associated with each of the plurality of power supplies. The at least one voltage can be a single voltage or can be an output voltage associated with each of the respective power supplies.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power supply system comprising a plurality of power supplies, each of the plurality of power supplies comprising:
    an oscillator system configured to generate a clock signal at a clock node, wherein the oscillator system of each of the plurality of power supplies is electrically coupled at the clock node to synchronize the clock signal associated with each of the plurality of power supplies;
    a pulse-width modulation (PWM) generator configured to generate a PWM switching signal based on an error voltage and the clock signal; and
    a power stage configured to generate an output voltage based on the PWM switching signal.

2. The system of claim 1, wherein the oscillator system associated with each of the plurality of power supplies is configured substantially the same, such that the frequency and signal characteristics of the clock signal are based on circuit characteristics and relative fabrication tolerances associated with the oscillator system associated with each of the plurality of power supplies.

3. The system of claim 1, wherein each of the plurality of power supplies is configured to generate a feedback voltage that is associated with the respective output voltage, and further comprises an error amplifier system configured to generate the error voltage, wherein the error amplifier associated with each of the plurality of power supplies comprises:
    an error amplifier configured to generate the error voltage at an error amplifier output node based on the feedback voltage associated with the respective one of the power supplies that comprises the error amplifier relative to a reference voltage; and
    a diode interconnecting the error amplifier output node and a comparison node electrically coupled to each of the plurality of power supplies, wherein the error amplifier system associated with one of the plurality of power supplies provides the error voltage to the comparison node via the diode, the PWM generator being coupled to the comparison node and being configured to generate the PWM switching signal based on the clock signal and the error voltage at the comparison node.

4. An integrated circuit (IC) comprising the power supply system of claim 1.

5. The IC of claim 4, further comprising a phase-shift controller configured to generate a plurality of clock signals, each of the plurality of clock signals being phase-shifted relative to each other, wherein the power stage of each of the plurality of power supplies is configured to control at least one switch based on the PWM switching signal to generate the output voltage, and wherein the PWM generator is configured to generate the PWM switching signal in response to one of the plurality of clock signals.

6. The IC of claim 4, wherein each of the plurality of power supplies are substantially spatially arranged on the IC.

7. A power supply system comprising a plurality of power supplies, each of the plurality of power supplies comprising:
    an error amplifier system comprising:
        an error amplifier configured to generate an error voltage at an error amplifier output node based on a feedback voltage of a respective corresponding one of the power supplies relative to a reference voltage; and
        a diode interconnecting the error amplifier output node and a comparison node electrically coupled to each of the plurality of power supplies, wherein the error amplifier system associated with one of the plurality of power supplies provides the error voltage to the comparison node via the diode;
    a pulse-width modulation (PWM) generator coupled to the comparison node and configured to generate a PWM switching signal based on the error voltage at the comparison node; and
    a power stage configured to generate an output voltage based on the PWM switching signal.

8. The system of claim 7, wherein the error amplifier system associated with each of the plurality of power supplies is configured substantially the same, such that the error amplifier system associated with a respective one of the plurality of power supplies provides the error voltage on the comparison node based on circuit characteristics and relative fabrication tolerances associated with the error amplifier system associated with each of the plurality of power supplies.

9. The system of claim 8, wherein the diode associated with the error amplifier system associated with a remaining at least one of the plurality of power supplies is reversed-bias in response to the error amplifier system associated with the respective one of the plurality of power supplies providing the error voltage on the comparison node.

10. The system of claim 7, wherein each of the plurality of power supplies further comprises an oscillator system configured to generate a clock signal at a clock node, wherein the PWM generator is configured to generate the PWM switching signal based on the error voltage and the clock signal at the clock node.

11. The system of claim 10, wherein the oscillator system of each of the plurality of power supplies is electrically coupled at the clock node to synchronize the clock signal associated with each of the plurality of power supplies.

12. An integrated circuit (IC) comprising the power supply system of claim 7.

13. The IC of claim 12, further comprising a phase-shift controller configured to generate a plurality of clock signals, each of the plurality of clock signals being phase-shifted relative to each other, wherein the power stage of each of the plurality of power supplies is configured to control at least one switch based on the PWM switching signal to generate the output voltage, and wherein the PWM generator is configured to generate the PWM switching signal in response to one of the plurality of clock signals.

14. The IC of claim 12, wherein each of the plurality of power supplies are substantially spatially arranged on the IC.

15. A power supply system comprising:
    a phase-shift controller configured to generate a plurality of clock signals, each of the plurality of clock signals being phase-shifted relative to each other; and
    a plurality of power supplies configured to generate at least one output voltage and being substantially spatially distributed, each of the plurality of power supplies comprising:

a power stage configured to control at least one switch based on a pulse-width modulation (PWM) switching signal to generate the respective at least one output voltage; and a PWM generator configured to generate the PWM switching signal in response to one of the plurality of clock signals.

16. The system of claim 15, wherein the phase-shift controller is configured to generate the plurality of clock signals based on a main clock signal generated by an oscillator system.

17. The system of claim 16, wherein the oscillator system comprises an oscillator system associated with each of the plurality of power supplies that are electrically coupled at a clock node on which the main clock signal is generated by the oscillator system of each of the plurality of power supplies.

18. The system of claim 15, wherein each of the plurality of power supplies is configured to generate a respective output voltage.

19. The system of claim 15, wherein the plurality of power supplies each comprise a common output node, such that the plurality of power supplies are collectively configured to generate an output voltage.

20. The system of claim 15, wherein each of the plurality of power supplies further comprises an error amplifier system configured to generate the error voltage, wherein the error amplifier associated with each of the plurality of power supplies comprises:

an error amplifier configured to generate the error voltage at an error amplifier output node based on a feedback voltage of a respective corresponding one of the power supplies relative to a reference voltage; and a diode interconnecting the error amplifier output node and a comparison node electrically coupled to each of the plurality of power supplies, wherein the error amplifier system associated with one of the plurality of power supplies provides the error voltage to the comparison node via the diode, the PWM generator being coupled to the comparison node and being configured to generate the PWM switching signal based on the respective one of the plurality of clock signals and the error voltage at the comparison node.

21. The system of claim 15, wherein the phase-shift controller is configured to generate each of the plurality of clock signals with a phase shift that is approximately equal with respect to each consecutive one of the plurality of clock signals.

22. An integrated circuit (IC) comprising the power supply system of claim 15.

23. A method for controlling a power supply system comprising a plurality of power supplies that are substantially spatially distributed, the method comprising:

generating a plurality of pulse-width modulation (PWM) switching signals based on at least one clock signal, each of the plurality of PWM switching signals being phase-shifted relative to each other;

providing the plurality of PWM switching signals to at least one switch in a power stage associated with the respective plurality of power supplies;

alternately activating and deactivating the at least one switch in each of the power stages relative to a remaining at least one of the plurality of power supplies based on the phase-shift of the plurality of PWM switching signals; and generating at least one output voltage based on the activation and deactivation of the at least one switch in the power stage associated with each of the plurality of power supplies.

24. The method of claim 23, further comprising:

generating a plurality of clock signals that are each phase-shifted relative to each other; and providing the plurality of clock signals to a respective plurality of PWM controllers that are each associated with a respective one of the plurality of power supplies of the power supply system, wherein generating the plurality of PWM switching signals comprises generating the plurality of PWM switching signals based on the respective plurality of clock signals.

25. The method of claim 24, wherein generating the plurality of clock signals comprises generating the plurality of clock signals in response to a main clock signal.

26. The method of claim 25, further comprising generating the main clock signal at a clock node via a plurality of oscillator systems associated with the respective plurality of power supplies, each of the plurality of oscillator systems having an output that is electrically coupled at the clock node, such that each of the plurality of oscillator systems are substantially synchronized.

27. The method of claim 23, further comprising generating a plurality of error voltages based on a feedback voltage associated with each of the plurality of power supplies relative to a reference voltage, wherein generating the plurality of PWM switching signals comprises generating the plurality of PWM switching signals based on the respective plurality of clock signals and the respective plurality of error voltages.

28. The method of claim 27, wherein generating the plurality of error voltages comprises forward-biasing one of a plurality of diodes associated with the respective plurality of power supplies to provide one of the plurality of error voltages to a comparison node, wherein generating the plurality of PWM switching signals comprises generating the plurality of PWM switching signals based on the respective plurality of clock signals and respective one of the plurality of error voltages.

29. The method of claim 23, wherein generating the plurality of PWM switching signals comprises generating the plurality of PWM switching signals to have a phase-shift that is approximately equal with respect to each consecutive one of the plurality of PWM switching signals.

* * * * *